(12) United States Patent
Sullivan et al.

(10) Patent No.: US 7,468,006 B2
(45) Date of Patent: *Dec. 23, 2008

(54) GOLF BALLS HAVING TWO OR MORE CORE LAYERS FORMED FROM HNP COMPOSITIONS

(75) Inventors: Michael J. Sullivan, Barrington, RI (US); Derek A. Ladd, Acushnet, MA (US); Edmund A. Hebert, Mattapoisett, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/738,740

(22) Filed: Apr. 23, 2007

(65) Prior Publication Data

US 2007/0207879 A1    Sep. 6, 2007

Related U.S. Application Data

(63) Continuation-in-part of application No. 11/304,962, filed on Dec. 15, 2005, now Pat. No. 7,207,903, which is a continuation-in-part of application No. 10/797,810, filed on Mar. 10, 2004, now Pat. No. 6,988,962, and a continuation-in-part of application No. 10/797,699, filed on Mar. 10, 2004, now Pat. No. 6,981,926.

(51) Int. Cl.
   *A63B 37/06* (2006.01)
(52) U.S. Cl. .................................. 473/376
(58) Field of Classification Search ................. 473/376, 473/373, 374, 368
See application file for complete search history.

(56) References Cited

U.S. PATENT DOCUMENTS

| | | |
|---|---|---|
| 4,508,309 A | 4/1985 | Brown |
| 4,625,964 A | 12/1986 | Yamada |
| 5,048,126 A | 9/1991 | McLaughlin |
| 5,104,126 A | 4/1992 | Gentiluomo |
| 5,184,828 A | 2/1993 | Kim et al. |
| 5,273,286 A | 12/1993 | Sun |
| 5,334,673 A | 8/1994 | Wu |
| 5,482,285 A | 1/1996 | Yabuki et al. |
| 5,743,816 A | 4/1998 | Ohsumi et al. |
| 5,772,531 A | 6/1998 | Ohsumi et al. |
| 5,824,746 A | 10/1998 | Harris et al. |
| 5,908,358 A | 6/1999 | Wu |
| 5,919,100 A | 7/1999 | Boehm et al. |
| 5,929,189 A | 7/1999 | Ichikawa et al. |
| 5,971,870 A | 10/1999 | Sullivan et al. |
| 6,025,442 A | 2/2000 | Harris et al. |
| 6,056,842 A | 5/2000 | Dalton et al. |
| 6,117,024 A | 9/2000 | Dewanjee |
| 6,120,393 A | 9/2000 | Sullivan et al. |
| 6,142,887 A | 11/2000 | Sullivan et al. |
| 6,210,294 B1 | 4/2001 | Wu |
| 6,302,808 B1 | 10/2001 | Dalton et al. |
| 6,309,313 B1 | 10/2001 | Peter |
| 6,476,176 B1 | 11/2002 | Wu |
| 6,653,382 B1 | 11/2003 | Statz et al. |
| 7,207,903 B2 * | 4/2007 | Sullivan et al. ............. 473/376 |
| 2002/0019268 A1 | 2/2002 | Tsunoda et al. |
| 2003/0050373 A1 | 3/2003 | Chen et al. |
| 2003/0114565 A1 | 6/2003 | Chen et al. |
| 2003/0130434 A1 | 7/2003 | Statz et al. |

* cited by examiner

*Primary Examiner*—Raeann Trimiew
(74) *Attorney, Agent, or Firm*—Mandi B. Milbank

(57) ABSTRACT

The present invention is directed to golf balls having a layer formed from a relatively soft HNP composition and a layer formed from a relatively hard HNP composition. Golf balls of the present invention have at least three layers, including an inner core layer, an outer core layer, a cover, and optionally an intermediate core layer. The present invention is not limited by which golf ball layers are formed from an HNP composition, so long as at least one layer is formed from a relatively soft HNP composition and at least one layer is formed from a relatively hard HNP composition. Relatively soft HNP compositions of the present invention comprise a highly neutralized acid copolymer preferably having a modulus of from 1,000 psi to 50,000 psi. Relatively hard HNP compositions of the present invention comprise a highly neutralized acid copolymer preferably having a modulus of from 25,000 psi to 150,000 psi.

20 Claims, No Drawings

GOLF BALLS HAVING TWO OR MORE CORE LAYERS FORMED FROM HNP COMPOSITIONS

CROSS-REFERENCE TO RELATED APPLICATIONS

This application is a continuation-in-part of U.S. patent application Ser. No. 11/304,962, filed Dec. 15, 2005, now U.S. Pat. No. 7,207,903, which is a continuation-in-part of U.S. patent application Ser. No. 10/797,810, filed Mar. 10, 2004, now U.S. Pat. No. 6,988,962, and U.S. patent application Ser. No. 10/797,699, filed Mar. 10, 2004, now U.S. Pat. No. 6,981,926, the entire disclosures of which are hereby incorporated herein by reference.

FIELD OF THE INVENTION

The present invention is directed to golf balls comprising a layer formed from a relatively soft HNP composition and a layer formed from a relatively hard HNP composition. The present invention is not limited by which layer is formed from the soft HNP composition and which layer is formed from the hard HNP composition, so long as both layers are present in the golf ball.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Golf ball core and cover layers are typically constructed with polymer compositions including, for example, polybutadiene rubber, polyurethanes, polyamides, ionomers, and blends thereof. Ionomers, particularly ethylene-based ionomers, are a preferred group of polymers for golf ball layers because of their toughness, durability, and wide range of hardness values.

Golf ball compositions comprising highly neutralized acid polymers are known. For example, U.S. Patent Application Publication No. 2003/0130434, the entire disclosure of which is hereby incorporated herein by reference, discloses melt-processible, highly-neutralized ethylene acid copolymers and process for making them by incorporating an aliphatic, mono-functional organic acid in the acid copolymer and then neutralizing greater than 90% of all the acid groups present. The use of such compositions in various golf ball layers is disclosed. Also, U.S. Patent Application Publication No. 2005/0148725, the entire disclosure of which is hereby incorporated herein by reference, discloses a highly-resilient thermoplastic composition comprising (a) an acid copolymer, (b) a salt of a high molecular weight, monomeric organic acid; (c) a thermoplastic resin; (d) a cation source; and (e) optionally, a filler. The reference also discloses one-piece, two-piece, three-piece, and multi-layered golf balls comprising the highly-resilient thermoplastic composition.

While various uses for highly neutralized acid polymers in golf balls have been discovered, there is a need in the industry to broaden the applicability of highly neutralized acid polymers to particular golf ball constructions having desirable spin, feel, and COR properties. The present invention provides such golf ball constructions through the use of a layer formed from a relatively soft HNP composition and a layer formed from a relatively hard HNP composition.

SUMMARY OF THE INVENTION

In one embodiment, the present invention is directed to a golf ball comprising an inner core layer, an outer core layer, and a cover. The inner core layer is formed from a first HNP composition and the outer core layer is formed from a second HNP composition. The first HNP composition has a Shore D hardness of 55 or less and comprises a highly neutralized ethylene/(meth)acrylic acid/alkyl (meth)acrylate copolymer. The second HNP composition has a Shore D hardness of 45 or greater and comprises a highly neutralized ethylene/(meth) acrylic acid copolymer. The Shore D hardness of the first HNP composition is less than the Shore D hardness of the second HNP composition.

In another embodiment, the present invention is directed to a golf ball comprising an inner core layer, an outer core layer, and a cover. The inner core layer is formed from a first HNP composition and the outer core layer is formed from a second HNP composition. The first HNP composition has a Shore D hardness of 45 or greater and comprises a highly neutralized ethylene/(meth)acrylic acid copolymer. The second HNP composition has a Shore D hardness of 55 or less and comprises a highly neutralized ethylene/(meth)acrylic acid/alkyl (meth)acrylate copolymer. The Shore D hardness of the first HNP composition is greater than the Shore D hardness of the second HNP composition.

In another embodiment, the present invention is directed to a golf ball comprising an inner core layer, an outer core layer, an intermediate core layer disposed between the inner core layer and the outer core layer, and a cover. The inner core layer comprises a diene rubber composition, the outer core layer is formed from a first HNP composition, and the intermediate core layer is formed from a second HNP composition. The first HNP composition has a Shore D hardness of 45 or greater and comprises a highly neutralized ethylene/(meth) acrylic acid copolymer. The second HNP composition has a Shore D hardness of 55 or less and comprises a highly neutralized ethylene/(meth)acrylic acid/alkyl (meth)acrylate copolymer. The Shore D hardness of the first HNP composition is greater than the Shore D hardness of the second HNP composition.

In yet another embodiment, the present invention is directed to a golf ball comprising an inner core layer, an outer core layer, an intermediate core layer disposed between the inner core layer and the outer core layer, and a cover. The inner core layer comprises a diene rubber composition, the outer core layer is formed from a first HNP composition, and the intermediate core layer is formed from a second HNP composition. The first HNP composition has a Shore D hardness of 55 or less and comprises a highly neutralized ethylene/(meth)acrylic acid/alkyl (meth)acrylate copolymer. The second HNP composition has a Shore D hardness of 45 or greater and comprises a highly neutralized ethylene/(meth)acrylic acid copolymer. The Shore D hardness of the first HNP composition is less than the Shore D hardness of the second HNP composition.

DETAILED DESCRIPTION OF THE INVENTION

Golf balls of the present invention have at least two layers formed from highly neutralized acid polymer ("HNP") compositions. More particularly, golf balls of the present invention have at least one layer formed from a relatively soft HNP composition, and at least one layer formed from a relatively hard HNP composition.

As used herein, "highly neutralized acid polymer" refers to an acid polymer after at least 80%, preferably at least 90%, more preferably at least 95%, and even more preferably 100%, of the acid groups of the acid polymer are neutralized.

As used herein, "hardness" refers to Shore D hardness as measured according to ASTM D2240.

As used herein, "modulus" refers to flexural modulus as measured using a standard flex bar according to ASTM D790-B.

Relatively Soft HNP Composition

Relatively soft HNP compositions of the present invention have a Shore D hardness of 55 or less, and preferably have a Shore D hardness within the range having a lower limit of 10 or 20 or 30 and an upper limit of 48 or 50 or 55.

Relatively soft HNP compositions of the present invention comprise at least one highly neutralized acid polymer. In a preferred embodiment, the highly neutralized acid polymer of the relatively soft HNP composition is a low modulus HNP having a modulus within the range having a lower limit of 1,000 or 5,000 or 10,000 psi and an upper limit of 17,000 or 25,000 or 28,000 or 30,000 or 35,000 or 45,000 or 50,000 or 55,000 psi. In a particular aspect of this embodiment, the modulus of the low modulus HNP is at least 10% less, or at least 20% less, or at least 25% less, or at least 30% less, or at least 35% less, than that of the high modulus HNP discussed below.

HNPs of the relatively soft HNP compositions of the present invention are salts of acid copolymers. It is understood that the HNP may be a blend of two or more HNPs. The acid copolymer of the HNP is an O/X/Y-type copolymer, wherein O is an α-olefin, X is a $C_3$-$C_8$ α,β-ethylenically unsaturated carboxylic acid, and Y is a softening monomer. O is preferably ethylene. X is preferably selected from (meth) acrylic acid, ethacrylic acid, maleic acid, crotonic acid, fumaric acid, and itaconic acid. (Meth)acrylic acid is particularly preferred. As used herein, "(meth)acrylic acid" means methacrylic acid and/or acrylic acid. Likewise, "(meth) acrylate" means methacrylate and/or acrylate. Y is preferably an alkyl(meth)acrylate, wherein the alkyl groups have from 1 to 8 carbon atoms. Preferred O/X/Y-type copolymers are those wherein O is ethylene, X is (meth)acrylic acid, and Y is selected from (meth) acrylate, n-butyl(meth) acrylate, isobutyl(meth)acrylate, methyl(meth)acrylate, and ethyl(meth) acrylate. Particularly preferred O/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The acid copolymer of the HNP typically includes the α-olefin in an amount of at least 15 wt %, or at least 25 wt %, or at least 40 wt %, or at least 60 wt %, based on the total weight of the acid copolymer. The amount of $C_3$-$C_8$ α,β-ethylenically unsaturated carboxylic acid in the acid copolymer is typically within the range having a lower limit of 1 or 4 or 6 or 8 or 10 or 15 wt % and an upper limit of 20 or 35 or 40 wt %, based on the total weight of the acid copolymer. The amount of softening monomer in the acid copolymer is typically within the range having a lower limit of 1 or 3 or 5 or 11 or 15 or 20 wt % and an upper limit of 23 or 25 or 30 or 35 or 50 wt %, based on the total weight of the acid copolymer.

Particularly suitable acid copolymers of the HNP of the relatively soft HNP composition include very low modulus ionomer-("VLMI-") type ethylene-acid polymers, such as Surlyn® 6320, Surlyn® 8120, Surlyn® 8320, and Surlyne 9320. Surlyne ionomers are commercially available from E.I. du Pont de Nemours and Company. Also suitable are DuPont® HPF 1000 and DuPont® HPF 2000, ionomeric materials commercially available from E.I. du Pont de Nemours and Company.

Additional suitable acid copolymers are disclosed, for example, in U.S. Patent Application Publication Nos. 2005/0148725, 2005/0020741, 2004/0220343, and 2003/0130434, and U.S. Pat. Nos. 5,691,418, 6,562,906, 6,653,382, 6,777,472, 6,762,246, and 6,815,480, the entire disclosures of which are hereby incorporated herein by reference.

In a preferred embodiment, the HNP of the relatively soft HNP composition is formed by reacting an acid copolymer, which is optionally partially neutralized, with a sufficient amount of cation source, in the presence of a high molecular weight organic acid or salt thereof, such that at least 80%, preferably at least 90%, more preferably at least 95%, and even more preferably 100%, of all acid groups present are neutralized. The acid copolymer can be reacted with the high molecular weight organic acid or salt thereof and the cation source simultaneously, or the acid copolymer can be reacted with the high molecular weight organic acid prior to the addition of the cation source.

Suitable high molecular weight organic acids are aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof, and combinations thereof. Salts of high molecular weight organic acids comprise the salts, particularly the barium, lithium, sodium, zinc, bismuth, chromium, cobalt, copper, potassium, stontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. Suitable organic acids and salts thereof are more fully described, for example, in U.S. Pat. No. 6,756,436, the entire disclosure of which is hereby incorporated herein by reference.

Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. The acid copolymer may be at least partially neutralized prior to contacting the acid copolymer with the cation source to form the HNP. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Relatively soft HNP compositions of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, high molecular weight organic acids and salts thereof, polyamides, polyesters, polyacrylates, polyurethanes, polyethers, polyureas, polyhydric alcohols, and combinations thereof. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof. Suitable organic acids are more fully described, for example, in U.S. Pat. No. 6,756,436, the entire disclosure of which is hereby incorporated herein by reference.

Additional melt flow modifiers suitable for use in compositions of the present invention, include the non-fatty acid melt flow modifiers described in copending U.S. patent application Ser. Nos. 11/216,725 and 11/216,726, the entire disclosures of which are hereby incorporated herein by reference.

Relatively soft HNP compositions of the present invention optionally include additive(s) and/or filler(s) in an amount of 50 wt % or less, or 30 wt % or less, or 15 wt % or less, based on the total weight of the relatively soft HNP composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully described in, for example, U.S. Patent Application Publication No. 2003/0225197, the entire disclosure of which is hereby incorporated herein by reference.

Relatively soft HNP compositions of the present invention optionally contain a high modulus HNP.

In a particular embodiment, the relatively soft HNP composition has a moisture vapor transmission rate of 8 g-mil/100 in$^2$/day or less (i.e., 3.2 g-mm/m$^2$·day or less), or 5 g-mil/100 in$^2$/day or less (i.e., 2.0 g-mm/m$^2$·day or less), or 3 g-mil/100 in$^2$/day or less (i.e., 1.2 g-mm/m$^2$·day or less), or 2 g-mil/100 in$^2$/day or less (i.e., 0.8 g-mm/m$^2$·day or less), or 1 g-mil/100 in$^2$/day or less (i.e., 0.4 g-mm/m$^2$·day or less), or less than 1 g-mil/100 in$^2$/day (i.e., less than 0.4 g-mm/m$^2$·day). As used herein, moisture vapor transmission rate ("MVTR") is given in g-mil/100 in$^2$/day, and is measured at 20° C. and according to ASTM F1249-99. In a preferred aspect of this embodiment, the relatively soft HNP composition comprises a low modulus HNP prepared using a cation source which is less hydrophilic than conventional magnesium-based cation sources. Suitable moisture resistant HNP compositions are disclosed, for example, in copending U.S. patent application Ser. No. 11/270,066 and U.S. Patent Application Publication No. 2005/0267240, the entire disclosures of which are hereby incorporated herein by reference.

Relatively soft HNP compositions of the present invention are not limited by any particular method or any particular equipment for making the compositions. In a preferred embodiment, the composition is prepared by the following process. The acid polymer(s), preferably a VLMI-type ethylene-acid terpolymer, high molecular weight organic acid(s) or salt(s) thereof, and optionally additive(s)/filler(s) are simultaneously or individually fed into a melt extruder, such as a single or twin screw extruder. A suitable amount of cation source is simultaneously or subsequently added such that at least 80%, preferably at least 90%, more preferably at least 95%, and even more preferably 100%, of all acid groups present are neutralized. The acid polymer may be at least partially neutralized prior to the above process. The components are intensively mixed prior to being extruded as a strand from the die-head.

Relatively soft HNP compositions of the present invention may be blended with one or more additional polymers, such as thermoplastic polymers and elastomers. Examples of thermoplastic polymers suitable for blending include, but are not limited to, bimodal ionomers (e.g., as disclosed in U.S. Patent Application Publication No. 2004/0220343 and U.S. Pat. Nos. 6,562,906 and 6,762,246, the entire disclosures of which are hereby incorporated herein by reference), ionomers modified with rosins (e.g., as disclosed in U.S. Patent Application Publication No. 2005/0020741, the entire disclosure of which is hereby incorporated by reference), soft and resilient ethylene copolymers (e.g., as disclosed U.S. Patent Application Publication No. 2003/0114565, the entire disclosure of which is hereby incorporated herein by reference) polyolefins, polyamides, polyesters, polyethers, polycarbonates, polysulfones, polyacetals, polylactones, acryloritrile-butadiene-styrene resins, polyphenylene oxide, polyphenylene sulfide, styrene-acrylonitrile resins, styrene maleic anhydride, polyimides, aromatic polyketones, ionomers and ionomeric precursors, acid copolymers, conventional HNPs, polyurethanes, grafted and non-grafted metallocene-catalyzed polymers, single-site catalyst polymerized polymers, high crystalline acid polymers, cationic ionomers, and combinations thereof. Particular polyolefins suitable for blending include one or more, linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins. Particular conventional HNPs suitable for blending include, but are not limited to, one or more of the HNPs disclosed in U.S. Pat. Nos. 6,756,436, 6,894,098, and 6,953,820, the entire disclosures of which are hereby incorporated herein by reference. Examples of elastomers suitable for blending with the invention polymers include natural and synthetic rubbers, including, but not limited to, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (cis and trans). Additional suitable blend polymers include those described in U.S. Pat. No. 5,981,658, for example at column 14, lines 30 to 56, the entire disclosure of which is hereby incorporated herein by reference. The blends described herein may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder.

Particularly suitable relatively soft HNP compositions include, but are not limited to, the highly-resilient thermoplastic compositions disclosed in U.S. Patent Application Publication No. 2005/0148725; the highly-neutralized ethylene copolymers disclosed in U.S. Pat. Nos. 6,653,382 and 6,777,472, and U.S. Patent Application Publication No. 2003/0130434; and the highly-resilient thermoplastic elastomer compositions disclosed in U.S. Pat. No. 6,815,480; the entire disclosures of which are hereby incorporated herein by reference.

Relatively Hard HNP Composition

Relatively hard HNP compositions of the present invention have a Shore D hardness of 45 or greater, and preferably have a Shore D hardness with the range having a lower limit of 45 or 50 or 55 and an upper limit of 75 or 80 Relatively hard HNP compositions of the present invention comprise at least one highly neutralized acid polymer. In a preferred embodiment, the highly neutralized acid polymer of the relatively hard HNP composition is a high modulus HNP having a modulus within the range having a lower limit of 25,000 or 27,000 or 30,000 or 40,000 or 45,000 or 50,000 or 55,000 or 60,000 psi and an upper limit of 72,000 or 75,000 or 100,000 or 150,000 psi.

HNPs of the relatively hard HNP compositions of the present invention are salts of acid copolymers. It is understood that the HNP may be a blend of two or more HNPs. Preferred acid copolymers are copolymers of an α-olefin and a $C_3$-$C_8$ α,β-ethylenically unsaturated carboxylic acid. The acid is typically present in the acid copolymer in an amount within the range having a lower limit of 1 or 10 or 12 or 15 or 20 wt % and an upper limit of 25 or 30 or 35 or 40 wt %, based on the total weight of the acid copolymer. The α-olefin is preferably selected from ethylene and propylene. The acid is preferably selected from (meth)acrylic acid, ethacrylic acid, maleic acid, crotonic acid, fumaric acid, and itaconic acid. (meth)acrylic acid is particularly preferred. In a preferred embodiment, the HNP of the relatively hard HNP composition has a higher level of acid than the HNP of the relatively soft HNP composition.

Suitable acid copolymers include partially neutralized acid polymers. Examples of suitable partially neutralized acid polymers include, but are not limited to, Surlyn® ionomers, commercially available from E.I. du Pont de Nemours and Company; Aclyn® ionomers, commercially available from Honeywell International Inc.; and Iotek® ionomers, commercially available from ExxonMobil Chemical Company. Also suitable are DuPont® HPF 1000 and DuPont® HPF 2000, ionomeric materials commercially available from E.I. du Pont de Nemours and Company. Additional suitable acid polymers are more fully described, for example, in U.S. Pat. Nos. 6,562,906, 6,762,246, and 6,953,820 and U.S. Patent Application Publication Nos. 2005/0049367, 2005/0020741, and 2004/0220343, the entire disclosures of which are hereby incorporated herein by reference.

In a preferred embodiment, the HNP of the relatively hard HNP composition is formed by reacting an acid copolymer with a sufficient amount of cation source such that at least 80%, preferably at least 90%, more preferably at least 95%, and even more preferably 100%, of all acid groups present are neutralized. Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. Metal ions and compounds of calcium and magnesium are particularly preferred. The acid copolymer may be at least partially neutralized prior to contacting the acid copolymer with the cation source to form the HNP. As previously stated, methods of preparing ionomers, and the acid copolymers on which ionomers are based, are disclosed, for example, in U.S. Pat. Nos. 3,264,272, and 4,351,931, and U.S. Patent Application Publication No. 2002/0013413.

Relatively hard HNP compositions of the present invention optionally contain one or more melt flow modifiers. The amount of melt flow modifier in the composition is readily determined such that the melt flow index of the composition is at least 0.1 g/10 min preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, high molecular weight organic acids and salts thereof, polyamides, polyesters, polyacrylates, polyurethanes, polyethers, polyureas, polyhydric alcohols, and combinations thereof. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof. Suitable organic acids are more fully described, for example, in U.S. Pat. No. 6,756,436, the entire disclosure of which is hereby incorporated herein by reference.

Additional melt flow modifiers suitable for use in compositions of the present invention, include the non-fatty acid melt flow modifiers described in copending U.S. patent application Ser. Nos. 11/216,725 and 11/216,726, the entire disclosures of which are hereby incorporated herein by reference.

Relatively hard HNP compositions of the present invention optionally include additive(s) and/or filler(s) in an amount within the range having a lower limit of 0 or 5 or 10 wt %, and an upper limit of 25 or 30 or 50 wt %, based on the total weight of the relatively hard HNP composition. Suitable additives and fillers include those previously described as suitable for the relatively soft HNP compositions of the present invention.

Relatively hard HNP compositions of the present invention optionally contain a low modulus HNP.

In a particular embodiment, the relatively hard HNP composition has an MVTR of 8 g-mil/100 in$^2$/day or less (i.e., 3.2 g-mm/m$^2$·day or less), or 5 g-mil/100 in$^2$/day or less (i.e., 2.0 g-mm/m$^2$·day or less), or 3 g-mil/100 in$^2$/day or less (i.e., 1.2 g-mm/m$^2$·day or less), or 2 g-mil/100 in$^2$/day or less (i.e., 0.8 g-mm/m$^2$·day or less), or 1 g-mil/100 in$^2$/day or less (i.e., 0.4 g-mm/m$^2$·day or less), or less than 1 g-mil/100 in$^2$/day (i.e., less than 0.4 g-mm/m$^2$·day). In a preferred aspect of this embodiment, the relatively hard HNP composition comprises a high modulus HNP prepared using a cation source which is less hydrophilic than conventional magnesium-based cation sources. Suitable moisture resistant HNP compositions are disclosed, for example, in copending U.S. patent application Ser. No. 11/270,066 and U.S. Patent Application Publication No. 2005/0267240, the entire disclosures of which are hereby incorporated herein by reference.

Relatively hard HNP compositions of the present invention are not limited by any particular method or any particular equipment for making the compositions. In a preferred embodiment, the composition is prepared by the following process. The acid polymer(s), preferably an ethylene/(meth) acrylic acid copolymer, optional melt flow modifier(s), and optional additive(s)/filler(s) are simultaneously or individually fed into a melt extruder, such as a single or twin screw extruder. A suitable amount of cation source is then added such that at least 80%, preferably at least 90%, more preferably at least 95%, and even more preferably 100%, of all acid groups present are neutralized. The acid polymer may be at least partially neutralized prior to the above process. The components are intensively mixed prior to being extruded as a strand from the die-head.

In another preferred embodiment, the relatively hard HNP composition is formed by combining a low modulus HNP with a sufficient amount of one or more additional material (s), including, but not limited to, additives, fillers, and polymeric materials, to increase the modulus such that the resulting composition has a modulus as described above for the high modulus HNP.

Relatively hard HNP compositions of the present invention may be blended with one or more additional polymers, such as thermoplastic polymers and elastomers. Examples of thermoplastic polymers and elastomers suitable for blending include those previously described as suitable for blending with the relatively soft HNP compositions of the present invention.

Golf Ball Applications

Golf balls of the present invention comprise at least one layer formed from a relatively soft HNP composition and at least one layer formed from a relatively hard HNP composition.

Golf ball layers formed from HNP compositions of the present invention have no substantial hardness difference between the center of the layer and the surface of the layer. This lack of a hardness gradient is a further attribute or characteristic property of such compositions. This does not necessarily mean that such a hardness gradient cannot be created with such compositions, but that without some unusual or additional step or process in the formation of the layer, a gradient of less than 5 Shore D, and typically less than 3 Shore D, is created when the layer is molded using conventional injection or compression molding. There exists the potential for creating a hardness gradient with HNP compositions, for example through the use of high energy radiation curing, such as electron beam or gamma radiation, peroxide crosslinking, or other means of covalently crosslinking a surface; however, the examples herein have substantially no hardness gradient.

In a preferred embodiment, the present invention provides a golf ball having a dual core and a cover, wherein the dual core includes a layer formed from a relatively soft HNP composition and a layer formed from a relatively hard HNP composition. The cover may be a single layer or dual cover.

Suitable cover layer materials for the golf balls disclosed herein include, but are not limited to, ionomer resin and blends thereof (particularly Surlyn® ionomer resin), polyurethanes, polyureas, (meth)acrylic acid, thermoplastic rubber polymers, polyethylene, and synthetic or natural vulcanized rubber, such as balata. When used as cover layer materials, polyurethane and polyurea can be thermoset or thermoplastic. Thermoset materials can be formed into golf ball layers by conventional casting or reaction injection molding techniques. Thermoplastic materials can be formed into golf ball layers by conventional compression or injection molding techniques. Light stable polyureas and polyurethanes are preferred for the outer cover layer material. Additional suitable cover and rubber core materials are disclosed, for example, in U.S. Patent Application Publication No. 2005/0164810, U.S. Pat. No. 5,919,100, and PCT Publications WO00/23519 and WO00/29129, the entire disclosures of which are hereby incorporated herein by reference. In embodiments of the present invention wherein a golf ball having a single layer cover is provided, the cover layer material is preferably selected from polyurethane and polyurea. In embodiments of the present invention wherein a golf ball having a dual cover is provided, the inner cover layer is preferably a high modulus thermoplastic, and the outer cover layer is preferably selected from polyurethane and polyurea.

The present invention is not limited by any particular process for forming the golf ball layer(s). It should be understood that the layer(s) can be formed by any suitable technique, including injection molding, compression molding, casting, and reaction injection molding.

When injection molding is used, the HNP composition is typically in a pelletized or granulated form that can be easily fed into the throat of an injection molding machine wherein it is melted and conveyed via a screw in a heated barrel at temperatures of from 150° F. to 600° F., preferably from 200° F. to 500° F. The molten HNP composition is ultimately injected into a closed mold cavity, which may be cooled, at ambient or at an elevated temperature, but typically the mold is cooled to a temperature of from 50° F. to 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

When compression molding is used to form a center, the HNP composition is first formed into a preform or slug of material, typically in a cylindrical or roughly spherical shape at a weight slightly greater than the desired weight of the molded core. Prior to this step, the HNP composition may be first extruded or otherwise melted and forced through a die after which it is cut into a cylindrical preform. It is that preform that is then placed into a compression mold cavity and compressed at a mold temperature of from 150° F. to 400° F., preferably from 250° F. to 350° F., and more preferably from 260° F. to 295° F. When compression molding a core or cover layer of an HNP composition, a half-shell is first formed via injection molding and then a core comprising one or more layers is enclosed within two half shells and then compression molded in a similar manner to the process previously described.

In the embodiments disclosed herein, the relatively soft HNP composition and/or the relatively hard HNP composition, can be either foamed or filled with density adjusting materials to provide desirable golf ball performance characteristics.

Any of the dual core embodiments of the present invention may have the same or different specific gravities. HNP compositions of the present invention, in the neat (i.e., unfilled) form, preferably have a specific gravity of from 0.95 g/cc to 0.99 g/cc. Any suitable filler, flake, fiber, particle, or the like, of an organic or inorganic material may be added to the HNP composition to increase or decrease the specific gravity, particularly to adjust the weight distribution within the golf ball, as further disclosed in U.S. Pat. Nos. 6,494,795, 6,547,677, 6,743,123, 7,074,137, and 6,688,991, the entire disclosures of which are hereby incorporated herein by reference.

In a particular embodiment, the present invention provides a dual core golf ball wherein the center (i.e., innermost core layer) has a specific gravity of 1.15 g/cc or less, preferably 1.10 g/cc or less, and more preferably 1.00 g/cc or less, and wherein the outer core layer has a specific gravity of 1.15 g/cc or greater, preferably 1.5 g/cc or greater, and more preferably 2.0 g/cc or greater.

In another particular embodiment, the present invention provides a dual core golf ball wherein the center has a specific gravity of 1.15 g/cc or greater, preferably 1.5 g/cc or greater, and more preferably 2.0 g/cc or greater, and wherein the outer core layer has a specific gravity of 1.15 g/cc or less, preferably 1.10 g/cc or less, and more preferably 1.00 g/cc or less.

In another embodiment, the present invention provides a golf ball comprising a center, at least one additional core layer, at least one cover layer, and an optional intermediate layer disposed between the core and the cover, wherein the center and additional core layer each have a reduced specific gravity (i.e., lower than that of the neat HNP composition), a cover layer and/or an intermediate layer have an increased specific gravity (i.e., greater than that of the neat HNP composition), and the resulting golf ball has a weight of 46.0 ounces or less.

In yet another embodiment, the present invention provides a golf ball comprising a center, at least one additional core layer, at least one cover layer, and an optional intermediate layer disposed between the core and the cover, wherein the center and additional core layer each have an increased specific gravity (i.e., greater than that of the neat HNP composition), a cover layer and/or an intermediate layer have a reduced specific gravity (i.e., lower than that of the neat HNP composition), and the resulting golf ball has a weight of 46.0 ounces or less.

Golf ball cores of the present invention, including dual cores and multi-layered cores, typically have a compression of less than 100, and preferably have a compression within the range having a lower limit of 20 or 50 and an upper limit of 80 or 90 or 100. Golf ball cores of the present invention typically have a coefficient of restitution ("COR") at 125 ft/s of at least 0.75, preferably at least 0.78, and more preferably at least 0.79.

Golf balls of the present invention typically have a compression of less than 120, and preferably have a compression within the range having a lower limit of 60 or 75 and an upper limit of 105 or 110 or 120. Golf balls of the present invention typically have a COR at 125 ft/s of at least 0.75, preferably at least 0.78, and more preferably at least 0.79.

For purposes of the present invention, compression is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

For purposes of the present invention, COR is determined according to a known procedure wherein a golf ball or golf ball subassembly (e.g., a golf ball core) is fired from an air cannon at a given velocity (125 ft/s for purposes of the present invention). Ballistic light screens are located between the air cannon and the steel plate to measure ball velocity. As the ball travels toward the steel plate, it activates each light screen, and the time at each light screen is measured. This provides an incoming transmit time period inversely proportional to the ball's incoming velocity. The ball impacts the steel plate and rebounds though the light screens, which again measure the time period required to transmit between the light screens. This provides an outgoing transmit time period inversely proportional to the ball's outgoing velocity. COR is then calculated as the ratio of the incoming transmit time period to the outgoing transmit time period, $COR=T_{in}/T_{out}$.

Dual Core/Single Cover Golf Balls

In one embodiment, the present invention provides a golf ball comprising an inner core layer formed from a relatively soft HNP composition, an outer core layer formed from a relatively hard HNP composition, and a cover having a single layer. In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the inner core layer composition is a low modulus HNP having a modulus within the range having a lower limit of 1,000 or 5,000 or 10,000 psi and an upper limit of 17,000 or 28,000 or 30,000 or 50,000 psi and the HNP of the outer core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the outer core has a thickness within the range having a lower limit of 0.020 or 0.025 or 0.032 inches and an upper limit of 0.310 or 0.440 or 0.560 inches; and the cover has a thickness within the range having a lower limit of 0.020 or 0.025 or 0.030 inches and an upper limit of 0.065 or 0.080 or 0.090 inches. In yet another particular aspect of this embodiment, the inner core layer has a compression of 80 or less, or 70 or less, or 65 or less.

In another embodiment, the present invention provides a golf ball comprising an inner core layer formed from a relatively hard HNP composition, an outer core layer formed from a relatively soft HNP composition, and a cover having a single layer. In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the inner core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi and the HNP of the outer core layer composition is a low modulus HNP having a modulus within the range having a lower limit of 1,000 or 5,000 or 10,000 psi and an upper limit of 17,000 or 28,000 or 30,000 or 50,000 psi. In another particular aspect of this embodiment, the inner core layer has a diameter within the range having a lower limit of 0.500 or 0.750 or 1.000 inches and an upper limit of 1.550 or 1.570 or 1.580 inches; the outer core has a thickness within the range having a lower limit of 0.020 or 0.025 or 0.032 inches and an upper limit of 0.310 or 0.440 or 0.560 inches;

and the cover has a thickness within the range having a lower limit of 0.020 or 0.025 or 0.030 inches and an upper limit of 0.065 or 0.080 or 0.090 inches. In yet another particular aspect of this embodiment, the inner core layer has a compression of at least 80, and preferably has a compression within the range having a lower limit of 80 or 90 or 100 and an upper limit of 130 or 140.

Dual Core/Dual Cover Golf Balls

In another embodiment, the present invention provides a golf ball comprising an inner core layer formed from a relatively soft HNP composition, an outer core layer formed from a relatively hard HNP composition, and a dual cover. In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the inner core layer composition is a low modulus HNP having a modulus within the range having a lower limit of 1,000 or 5,000 or 10,000 psi and an upper limit of 17,000 or 28,000 or 30,000 or 50,000 psi and the HNP of the outer core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the outer core has a thickness within the range having a lower limit of 0.020 or 0.025 or 0.032 inches and an upper limit of 0.310 or 0.440 or 0.560 inches; and the dual cover has an overall thickness within the range having a lower limit of 0.020 or 0.025 or 0.060 inches and an upper limit of 0.075 or 0.090 or 0.110 inches. In yet another particular aspect of this embodiment, the inner core layer has a compression of 80 or less, or 70 or less, or 65 or less.

In another embodiment, the present invention provides a golf ball comprising an inner core layer formed from a relatively hard HNP composition, an outer core layer formed from a relatively soft HNP composition, and a dual cover. In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the inner core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi and the HNP of the outer core layer composition is a low modulus HNP having a modulus within the range having a lower limit of 1,000 or 5,000 or 10,000 psi and an upper limit of 17,000 or 28,000 or 30,000 or 50,000 psi. In another particular aspect of this embodiment, the inner core layer has a diameter within the range having a lower limit of 0.500 or 0.750 or 1000 inches and an upper limit of 1.550 or 1.570 or 1.580 inches; the outer core has a thickness within the range having a lower limit of 0.020 or 0.025 or 0.032 inches and an upper limit of 0.310 or 0.440 or 0.560 inches; and the dual cover has an overall thickness within the range having a lower limit of 0.020 or 0.025 or 0.060 inches and an upper limit of 0.075 or 0.090 or 0.110 inches. In yet another particular aspect of this embodiment, the inner core layer has a compression of at least 80, and preferably has a compression within the range having a lower limit of 80 or 90 or 100 and an upper limit of 130 or 140.

Golf Balls Having Multi-Layered Cores

By the present invention, it has been found that, in some embodiments, the use of a relatively soft HNP-based layer and a relatively hard HNP-based layer eliminates the need for conventional rubber-based layers. However, it is contemplated that it may be desirable to include conventional rubber-based layers in some embodiments of the present invention.

Thus, in one embodiment, the present invention provides a golf ball comprising:
(a) an inner core layer comprising a rubber composition,
(b) an intermediate core layer formed from a relatively soft HNP composition,
(c) an outer core layer formed from a relatively hard HNP composition, and
(d) a cover having one or more layers.

In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the intermediate core layer composition is a low modulus HNP having a modulus within the range having a lower limit of 1,000 or 5,000 or 10,000 psi and an upper limit of 17,000 or 28,000 or 30,000 or 50,000 psi and the HNP of the outer core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the intermediate core layer has a thickness within the range having a lower limit of 0.020 or 0.025 or 0.032 inches and an upper limit of 0.150 or 0.220 or 0.280 inches; the outer core has a thickness within the range having a lower limit of 0.020 or 0.025 or 0.032 inches and an upper limit of 0.310 or 0.440 or 0.560 inches; and the cover has an overall thickness within the range having a lower limit of 0.020 or 0.025 or 0.030 inches and an upper limit of 0.065 or 0.080 or 0.090 inches. In yet another particular aspect of this embodiment, the inner core layer has a compression of 80 or less, or 70 or less, or 65 or less.

In another embodiment, the present invention provides a golf ball comprising:
(a) an inner core layer formed from a relatively soft HNP composition,
(b) an intermediate core layer comprising a rubber composition,
(c) an outer core layer formed from a relatively hard HNP composition, and
(d) a cover having one or more layers.

In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft FNP composition is less than the Shore D hardness of the relatively hard HNP composition. In another particular aspect of this embodiment, the HNP of the inner core layer composition is a low modulus HNP having a modulus within the range having a lower limit of 1,000 or 5,000 or 10,000 psi and an upper limit of 17,000 or 28,000 or 30,000 or 50,000 psi and the HNP of the outer core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the intermediate core layer has a thickness within the range having a lower limit of 0.020 or 0.025 or 0.032 inches and an upper limit of 0.150 or 0.220 or 0.280 inches; the outer core has a thickness within the range having a lower limit of 0.020 or 0.025 or 0.032 inches and an upper limit of 0.310 or 0.440 or 0.560 inches; and the cover has an overall thickness within the range having a lower limit of 0.020 or 0.025 or 0.030 inches and an upper limit of 0.065 or 0.080 or 0.090 inches. In yet another particular aspect of this embodiment, the inner core layer has a compression of 80 or less, or 70 or less, or 65 or less.

In another embodiment, the present invention provides a golf ball comprising:
 (a) an inner core layer formed from a relatively soft HNP composition,
 (b) an intermediate core layer formed from a relatively hard HNP composition,
 (c) an outer core layer comprising a rubber composition, and
 (d) a cover having one or more layers.

In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of is the relatively soft HNP composition is less than the Shore D hardness of the relatively hard HNP composition. In another particular aspect of this embodiment, the HNP of the inner core layer composition is a low modulus HNP having a modulus within the range having a lower limit of 1,000 or 5,000 or 10,000 psi and an upper limit of 17,000 or 28,000 or 30,000 or 50,000 psi and the HNP of the intermediate core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the intermediate core layer has a thickness within the range having a lower limit of 0.020 or 0.025 or 0.032 inches and an upper limit of 0.150 or 0.220 or 0.280 inches; the outer core has a thickness within the range having a lower limit of 0.020 or 0.025 or 0.032 inches and an upper limit of 0.310 or 0.440 or 0.560 inches; and the cover has an overall thickness within the range having a lower limit of 0.020 or 0.025 or 0.030 inches and an upper limit of 0.065 or 0.080 or 0.090 inches. In yet another particular aspect of this embodiment, the inner core layer has a compression of 80 or less, or 70 or less, or 65 or less.

In another embodiment, the present invention provides a golf ball comprising:
 (a) an inner core layer comprising a rubber composition,
 (b) an intermediate core layer formed from a relatively hard HNP composition,
 (c) an outer core layer formed from a relatively soft HNP composition, and
 (d) a cover having one or more layers.

In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the outer core layer composition is a low modulus HNP having a modulus within the range having a lower limit of 1,000 or 5,000 or 10,000 psi and an upper limit of 17,000 or 28,000 or 30,000 or 50,000 psi and the HNP of the intermediate core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the intermediate core layer has a thickness within the range having a lower limit of 0.020 or 0.025 or 0.032 inches and an upper limit of 0.150 or 0.220 or 0.280 inches; the outer core has a thickness within the range having a lower limit of 0.020 or 0.025 or 0.032 inches and an upper limit of 0.310 or 0.440 or 0.560 inches; and the cover has an overall thickness within the range having a lower limit of 0.020 or 0.025 or 0.030 inches and an upper limit of 0.065 or 0.080 or 0.090 inches. In yet another particular aspect of this embodiment, the inner core layer has a compression of 80 or less, or 70 or less, or 65 or less.

In another embodiment, the present invention provides a golf ball comprising:
 (a) an inner core layer formed from a relatively hard HNP composition,
 (b) an intermediate core layer formed from a relatively soft HNP composition,
 (c) an outer core layer comprising a rubber composition, and
 (d) a cover having one or more layers.

In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the intermediate core layer composition is a low modulus HNP having a modulus within the range having a lower limit of 1,000 or 5,000 or 10,000 psi and an upper limit of 17,000 or 28,000 or 30,000 or 50,000 psi and the HNP of the inner core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the intermediate core layer has a thickness within the range having a lower limit of 0.020 or 0.025 or 0.032 inches and an upper limit of 0.150 or 0.220 or 0.280 inches; the outer core has a thickness within the range having a lower limit of 0.020 or 0.025 or 0.032 inches and an upper limit of 0.310 or 0.440 or 0.560 inches; and the cover has an overall thickness within the range having a lower limit of 0.020 or 0.025 or 0.030 inches and an upper limit of 0.065 or 0.080 or 0.090 inches. In yet another particular aspect of this embodiment, the inner core layer has a compression of at least 80, and preferably has a compression within the range having a lower limit of 80 or 90 or 100 and an upper limit of 130 or 140.

In another embodiment, the present invention provides a golf ball comprising:
(a) an inner core layer formed from a relatively hard HNP composition,
(b) an intermediate core layer comprising a rubber composition,
(c) an outer core layer formed from a relatively soft HNP composition, and
(d) a cover having one or more layers.

In a particular aspect of this embodiment, the relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. In another particular aspect of this embodiment, the HNP of the outer core layer composition is a low modulus HNP having a modulus within the range having a lower limit of 1,000 or 5,000 or 10,000 psi and an upper limit of 17,000 or 28,000 or 30,000 or 50,000 psi and the HNP of the inner core layer composition is a high modulus HNP having a modulus within the range having a lower limit of 25,000 or 27,000 or 45,000 or 55,000 or 60,000 psi and an upper limit of 72,000 or 75,000 or 100,000 or 150,000 psi. In another particular aspect of this embodiment, the inner core layer has a diameter within the range having a lower limit of 0.500 or 0.750 or 1.000 inches and an upper limit of 1.550 or 1.570 or 1.580 inches; the intermediate core layer has a thickness within the range having a lower limit of 0.020 or 0.025 or 0.032 inches and an upper limit of 0.150 or 0.220 or 0.280 inches; the outer core has a thickness within the range having a lower limit of 0.020 or 0.025 or 0.032 inches and an upper limit of 0.310 or 0.440 or 0.560 inches; and the cover has an overall thickness within the range having a lower limit of 0.020 or 0.025 or 0.030 inches and an upper limit of 0.065 or 0.080 or 0.090 inches. In yet another particular aspect of this embodiment, the inner core layer has a compression of at least 80, and preferably has a compression within the range having a lower limit of 80 or 90 or 100 and an upper limit of 130 or 140.

Suitable rubbers for golf ball layers of the present invention include natural and synthetic rubbers, including, but not limited to, polybutadiene, polyisoprene, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, copolymers of butadiene with acrylonitrile, polychloroprene, alkyl acrylate rubber, chlorinated isoprene rubber, acrylonitrile chlorinated isoprene rubber, and combinations thereof. Diene rubbers are preferred.

In embodiments wherein the inner core layer comprises a rubber composition, the inner core layer is preferably formed from a reaction product of a rubber, a crosslinking agent, a filler, a co-crosslinking agent or free radical initiator, and optionally a cis-to-trans catalyst. The rubber is preferably selected from polybutadiene and styrene-butadiene. The crosslinking agent typically includes a metal salt, such as a zinc salt or magnesium salt, of an acid having from 3 to 8 carbon atoms, such as (meth)acrylic acid. The free radical initiator can be any known polymerization initiator which decomposes during the cure cycle, including, but not limited to, dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy)hexane or di-t-butyl peroxide, and mixtures thereof. Suitable types and amounts of rubber, crosslinking agent, filler, co-crosslinking agent, and initiator are more fully described in, for example, U.S. Patent Application Publication No. 2003/0144087, the entire disclosure of which is hereby incorporated herein by reference. Reference is also made to U.S. Patent Application Publication No. 2003/0144087 for various ball constructions and materials that can be used in golf ball core, intermediate, and cover layers.

Wound Golf Balls

In one embodiment, the present invention provides a wound golf ball comprising a core, a conventional clastomeric winding wound around the core, and a cover made from a conventional golf ball cover material, e.g., ionomer resin and blends thereof (particularly Surlyn® ionomer resin), thermoset polyurethanes and polyureas, thermoplastic polyurethanes and polyureas, (meth)acrylic acid, thermoplastic rubber polymers, polyethylene, and synthetic or natural vulcanized rubber, such as balata.

In a particular aspect of this embodiment, the core includes an inner core layer formed from a relatively soft HNP composition and an outer core layer formed from a relatively hard HNP composition. The relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. The inner core layer preferably has a diameter of from 0.500 to 1.250 inches. The outer core layer preferably has a thickness of from 0.125 to 0.525 inches. The overall core diameter is preferably from 1.000 to 1.550 inches. The HNP of the inner core layer composition is preferably a low modulus HNP having a modulus within the range having a lower limit of 1,000 or 5,000 or 10,000 psi and an upper limit of 17,000 or 28,000 or 30,000 or 50,000 psi. The HNP of the outer cover layer composition is preferably a high modulus HNP having a modulus within the range having a lower limit of 25,000 or 27,000 or 45,000 or 55,000 or 60,000 psi and an upper limit of 72,000 or 75,000 or 100,000 or 150,000 psi.

In another particular aspect of this embodiment, the core includes an inner core layer formed from a relatively hard HNP composition and an outer core layer formed from a relatively soft HNP composition. The relatively soft HNP composition has a Shore D hardness of 55 or less, preferably from 10 to 55, the relatively hard HNP composition has a Shore D hardness of 45 or greater, preferably from 45 to 80, and the Shore D hardness of the relatively soft HNP composition is less than the Shore D hardness of the relatively hard HNP composition. The inner core layer preferably has a diameter of from 0.500 to 1.250 inches. The outer core layer preferably has a thickness of from 0.125 to 0.525 inches. The overall core diameter is preferably from 1.000 to 1.550 inches. The HNP of the inner cover layer composition is preferably a high modulus HNP having a modulus within the range having a lower limit of 25,000 or 27,000 or 45,000 or 55,000 or 60,000 psi and an upper limit of 72,000 or 75,000 or 100,000 or 150,000 psi. The HNP of the outer core layer composition is preferably a low modulus HNP having a modulus within the range having a lower limit of 1,000 or 5,000 or 10,000 psi and an upper limit of 17,000 or 28,000 or 30,000 or 50,000 psi.

Wound golf balls of the present invention are manufactured by well known techniques, such as those disclosed, for example, in U.S. Pat. No. 4,846,910.

Additional Examples of Suitable HNPs

The HNPs of Table 1 below are ethylene/acrylic acid copolymers and terpolymers that have been found to be particularly useful as the relatively soft HNP and/or the relatively hard HNP of the present invention.

TABLE 1

| Example | Cation Source | Cation Content (wt %) | Flexural Modulus[1] (psi) | Hardness[2] (Shore C, 18 day) | Hardness[2] (Shore D) | Polymer Type[3] | Acrylic Acid Content (wt %) | Fatty Acid Type | Fatty Acid Content (wt %) |
|---|---|---|---|---|---|---|---|---|---|
| 1 | Ca/Mg | 3.25/0.70 | 71,600 | 88 | 57 | copolymer | 14.9 | stearic | * |
| 2 | Ca/Li | 2.94/0.36 | 70,300 | 89 | 58 | copolymer | 13.2 | stearic | * |
| 3 | Ca | 4.05 | 70,100 | 92 | 60 | copolymer | 13.5 | stearic | * |
| 4 | Ca/Zn | 2.52/2.31 | 60,400 | 88 | 58 | copolymer | 13.5 | stearic | * |
| 5 | Mg | 2.55 | 38,300 | 84 | 52 | terpolymer | 10.0 | stearic | 33 |
| 6 | Mg | 2.86 | 27,600 | 84 | 52 | copolymer | 12.8 | oleic | 24 |
| 7 | Mg | 2.67 | 16,300 | 78 | 45 | terpolymer | 11.5 | oleic | 27 |
| 8 | Mg | 3.21 | 10,600 | 70 | 40 | terpolymer | 12.7 | oleic | 33 |
| 9 | Mg | 2.88 | 10,400 | 69 | 39 | terpolymer | 11.8 | oleic | 31 |
| 10 | Ca | 3.21 | 60,300 | * | 37 | copolymer | 10.2 | stearic | * |
| 11 | Ca | 3.62 | 69,300 | 90 | 60 | copolymer | 11.9 | stearic | * |
| 12 | Mg | 2.24 | 7,300 | * | 37 | terpolymer | 12.3 | erucic | * |

[1]Flexural modulus was measured according to ASTM D790-03 Procedure B.
[2]Hardness was measured according to ASTM D2240.
[3]copolymer: poly(ethylene-acrylic acid) terpolymer: poly(ethylene-n-butyl acrylate-acrylic acid)
* Data not available.

In embodiments of the present invention directed to a golf ball having an inner core, intermediate core, or outer core layer formed from a relatively soft HNP composition, Examples 5-10 and 12 are particularly suitable for use as the relatively soft HNP composition.

In embodiments of the present invention directed to a golf ball having an inner core layer or intermediate core layer formed from a relatively hard HNP composition, Examples 1-6 and 11 are particularly suitable for use as the relatively hard HNP composition of the inner core layer or intermediate core layer.

In embodiments of the present invention directed to a golf ball having an outer core layer formed from a relatively hard HNP composition, Examples 1-4 and 11 are particularly suitable for use as the relatively hard HNP composition of the outer core layer.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising:
    (a) an inner core layer formed from a first HNP composition, the first HNP composition having a Shore D hardness of 55 or less and comprising a highly neutralized ethylene/(meth)acrylic acid/alkyl(meth)acrylate copolymer;
    (b) an outer core layer formed from a second HNP composition, the second HNP composition having a Shore D hardness of 45 or greater and comprising a highly neutralized ethylene/(meth)acrylic acid copolymer; and
    (c) a cover;
    wherein the Shore D hardness of the first HNP composition is less than the Shore D hardness of the second HNP composition.

2. The golf ball of claim 1, wherein the Shore D hardness of the first HNP composition is from 10 to 55.

3. The golf ball of claim 1, wherein the Shore D hardness of the first HNP composition is from 20 to 50.

4. The golf ball of claim 1, wherein the Shore D hardness of the first HNP composition is from 30 to 48.

5. The golf ball of claim 1, wherein the Shore D hardness of the second HNP composition is from 50 to 80.

6. The golf ball of claim 1, wherein the Shore D hardness of the second HNP composition is from 55 to 75.

7. The golf ball of claim 1, wherein the Shore D hardness of the first HNP composition is at least 3 less than the Shore D hardness of the second HNP composition.

8. The golf ball of claim 1, wherein the first HNP composition has a modulus of from 1,000 psi to 50,000 psi.

9. The golf ball of claim 1, wherein the second HNP composition has a modulus of from 25,000 psi to 150,000 psi.

10. The golf ball of claim 1, wherein the first HNP composition has a modulus of from 1,000 psi to 50,000 psi, the second HNP composition has a modulus of from 25,000 psi to 150,000 psi, and the modulus of the first HNP composition is at least 10% less than the modulus of the second HNP composition.

11. The golf ball of claim 10, wherein the modulus of the first HNP composition is at least 25% less than the modulus of the second HNP composition.

12. The golf ball of claim 1, wherein the golf ball additionally comprises an intermediate core layer disposed between the inner core layer and the outer core layer, wherein the intermediate core layer is formed from a diene rubber composition.

13. A golf ball comprising:
(a) an inner core layer formed from a first HNP composition, the first HNP composition having a Shore D hardness of 45 or greater and comprising a highly neutralized ethylene/(meth)acrylic acid copolymer;
(b) an outer core layer formed from a second HNP composition, the second HNP composition having a Shore D hardness of 55 or less and comprising a highly neutralized ethylene/(meth)acrylic acid/alkyl(meth)acrylate copolymer; and
(c) a cover;
wherein the Shore D hardness of the first HNP composition is greater than the Shore D hardness of the second HNP composition.

14. The golf ball of claim 13, wherein the Shore D hardness of the second HNP composition is from 10 to 55.

15. The golf ball of claim 13, wherein the Shore D hardness of the second HNP composition is from 20 to 50.

16. The golf ball of claim 13, wherein the Shore D hardness of the first HNP composition is from 50 to 80.

17. The golf ball of claim 13, wherein the Shore D hardness of the second HNP composition is at least 3 less than the Shore D hardness of the first HNP composition.

18. The golf ball of claim 13, wherein the second HNP composition has a modulus of from 1,000 psi to 50,000 psi.

19. The golf ball of claim 13, wherein the first HNP composition has a modulus of from 25,000 psi to 150,000 psi.

20. The golf ball of claim 13, wherein the second HNP composition has a modulus of from 1,000 psi to 50,000 psi, the first HNP composition has a modulus of from 25,000 psi to 150,000 psi, and the modulus of the second HNP composition is at least 10% less than the modulus of the first HNP composition.

* * * * *